Aug. 5, 1958     D. N. SEWELL     2,846,174
DETACHABLE BRACKETS
Filed July 15, 1953

INVENTOR
DONALD N. SEWELL
BY Ralph B. Stewart
ATTORNEY

United States Patent Office 2,846,174
Patented Aug. 5, 1958

2,846,174

DETACHABLE BRACKETS

Donald N. Sewell, West Chester, Pa., assignor to Wind Turbine Company, a corporation of Pennsylvania Application July 15, 1953, Serial No. 368,109

3 Claims. (Cl. 248—223)

This invention is concerned with brackets for detachable connection to a supporting structure. While the invention is especially useful as a stand-off insulator bracket, it may be used for supporting other devices or elements.

An object of the invention is to devise a bracket of simple construction which may be easily applied and removed from a supporting structure.

A more specific object is to devise a bracket which may be detachably supported upon the vertical spars of a tower structure, such as a radio or television tower.

My invention is illustrated in the accompanying drawing, in which.

Figure 1:
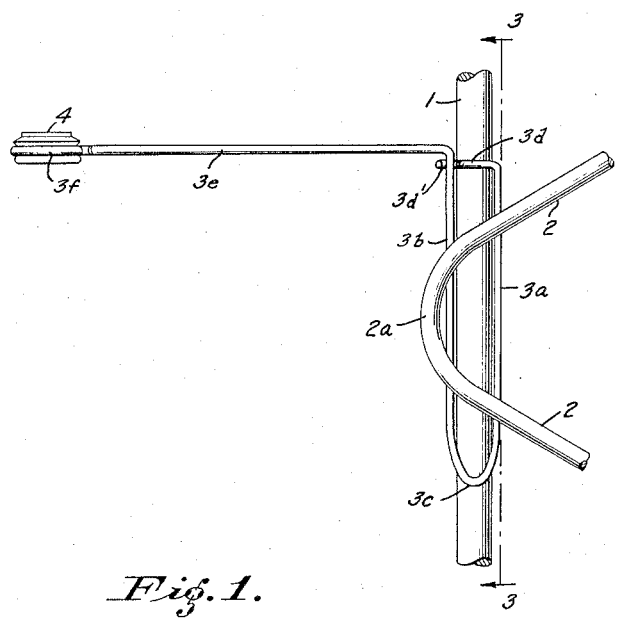
Figure 1 is an elevational view of a bracket according to my invention supported upon a vertical spar of a tower, only a fragmentary part of the tower being shown.

The bracket illustrated in the drawing is especially designed for attachment to one of the vertical spars of a radio tower for supporting an insulator in spaced relation with respect to the tower. The drawing does not illustrate the complete tower structure, but only a fragmentary part thereof. Briefly, the tower consists of three or more vertical spars rigidly joined together by bracing members applied across adjacent pairs of spars.

In the drawing, a section of one vertical spar of a tower is shown at 1, and a portion of a bracing member is shown at 2. In this case, the bracing member 2 is formed of a serpentine rod having the loop portions thereof lapping over alternate spars in a pair, see loop portion 2a lapping over the spar 1. The bracing member is secured to the spar at the two points of contact of the loop portion, as by welding. It would be understood that the bracket of my invention is not limited in its use to towers using bracing members of this particular type, but other bracing members may be employed so long as they are arranged transversely of the spars and have portions extending in opposite directions from the spar.

Figure 2:
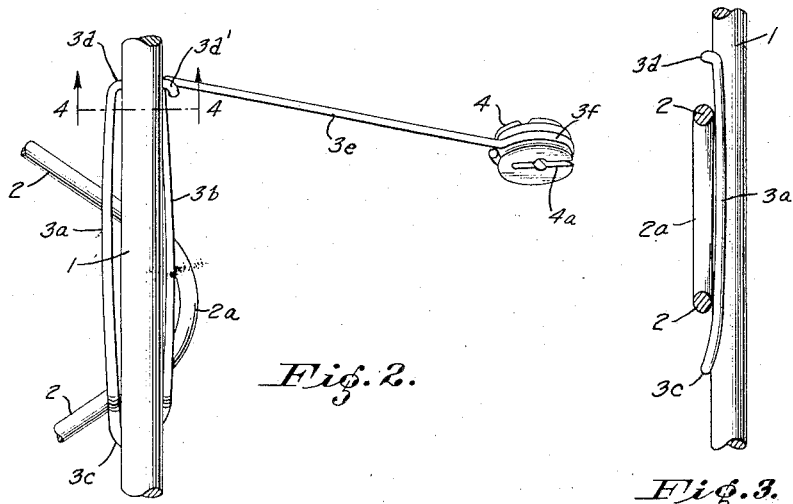
Figure 2 is a perspective view of Figure 1 taken from the rear of Figure 1 and below the axis of the horizontal arm of the bracket.
Figure 3:
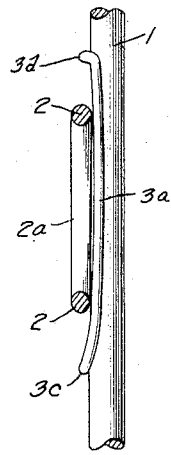
Figure 3 is a sectional view of Figure 1 taken along the line 3—3.
Figure 4:
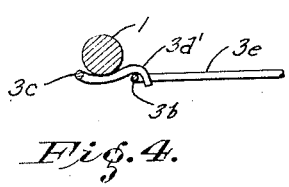
Figure 4 is a sectional view of Figure 2 taken along the line 4—4.

The bracket is formed of heavy wire or metallic rod and comprises a loop of the hairpin type formed of two parallel legs 3a and 3b joined by a yoke portion 3c. At the end of leg 3a, a bridge portion 3d extends across the loop and is terminated by a hook 3d' which is adapted to hook around the opposite portion of the leg 3b. Preferably, the yoke portion of the U-shaped loop is normally bent out of the plane of the loop in its unstressed state, as shown in Figure 4, and the open side of the hook portion 3d' faces to the same side of the loop. Also, it is preferred that the bridge portion 3d should be bowed somewhat towards the same side of the loop as the yoke section 3c, see Figure 3. The end of the leg 3b beyond the hook 3d' extends away from the hairpin loop in the form of a lateral arm 3e, and the end of this arm is formed into a broken ring 3f which surrounds an insulator 4 having an opening for receiving an electric conductor. In the example illustrated in the drawing, and as shown in Figure 2, the insulator is slotted at 4a for receiving a two-conductor lead-in tape commonly used in connection with television antennae. This type of insulator and ring support is well known in the art. Obviously, other types of insulators may be used if desired.

The manner in which the bracket is mounted upon the spar 1 is illustrated in the various figures of the drawing. As will be seen, the bracket is mounted upon the spar so that the two parallel legs 3a and 3b of the elongated U-shaped loop pass beneath the bracing member 2 and the extension 2a thereof on opposite sides of the spar, and the yoke portion 3c and the bridge 3d pass over the spar 1 on the same side of the spar as the bracing member 2, the hook portion 3d' on the end of the bridge 3d being hooked underneath the outer end portion of the leg 3b. The natural resilience of the material from which the bracket is formed maintains the legs 3a and 3b in strong frictional contact with the bracing member 2, and the yoke portion 3c and the bridge portion 3d are also held in strong frictional contact with the spar 1.

In applying the bracket to the spar, the bridge portion 3d is unhooked from the leg 3b and the hairpin loop is opened until it can be passed over the spar 1 below the bracing member 2. The hairpin loop is then moved upwardly until the open end of the loop is above the upper portion of the bracing member 2, and the bridge portion 3d is deflected so that it can be passed across spar 1 in the same plane as the bracing member 2, and the hook portion 3d' is hooked under the leg 3b. In removing the bracket from the spar, it is only necessary to deflect the leg 3b to remove it from engagement by the hook 3d', then the leg 3a is deflected away from the spar 1 until the hairpin loop opens a sufficient distance to allow the open end of the loop to become disengaged from the spar 1.

While the transverse or cross member 2 which holds the bracket in position on the spar functions also as a bracing member for the tower, it is obvious that the bracket may be held in position by a cross member which does not serve a bracing function.

I claim:

1. A supporting bracket comprising resilient rod-like material formed into an elongated U-shaped loop having substantially straight legs extending from a yoke portion in substantially parallel relation, one leg of said loop having the end portion thereof bent substantially at right angles to the axis of the main portion of the leg and extending across a straight portion of the opposite leg of the loop to form a bridge portion, and a terminal portion of said bridge portion being formed as an open hook for releasable hook-engagement with the said straight portion of the opposite leg of said loop, and a bracket arm extending away from said loop at the end of said other leg substantially at right angles thereto.

2. A supporting bracket comprising resilient rod-like material formed into an elongated U-shaped loop having substantially straight legs extending from a yoke portion in substantially parallel relation, one leg of said loop having the end portion thereof bent substantially at right angles to the axis of the main portion of the leg and extending across a straight portion of the opposite leg of the loop to form a bridge portion, and a terminal portion of said bridge portion being formed as an open hook for releasable hook-engagement with the said straight portion of the opposite leg of said loop, and a bracket arm extending away from said loop at the end of said other leg substantially at right angles thereto, said yoke portion of said U-shaped loop joining the legs thereof being inclined out of the plane of the major portion of the loop to one side thereof, and the open side of the hook on said bridge portion faces to the same side of the loop.

3. A supporting bracket comprising a rod-like support, a cross-member secured to said support at one side thereof and having portions extending in opposite directions from said support, an elongated U-shaped loop of resilient rod-like material having the legs thereof arranged parallel with said support on opposite sides thereof and extending across said cross-member, the yoke portion of said loop passing over said support on the same side as said cross-member, a bridge element carried by one leg of said loop and extending across said support on the same side as said cross-member and having a hook portion at the end thereof hooked over the opposite leg of said loop, and a bracket arm extending from said opposite leg laterally from said loop.

References Cited in the file of this patent

UNITED STATES PATENTS

| | | |
|---|---|---|
| 753,046 | Corts | Feb. 23, 1904 |
| 816,473 | Johnson | Mar. 27, 1906 |
| 948,671 | Muller | Feb. 8, 1910 |
| 1,016,822 | Golden | Feb. 6, 1912 |
| 1,943,626 | Richard | Jan. 16, 1934 |
| 2,451,020 | Davis | Oct. 12, 1948 |

FOREIGN PATENTS

| | | |
|---|---|---|
| 123,361 | Germany | of 1900 |
| 240,905 | Germany | of 1911 |